United States Patent
Gupta et al.

(10) Patent No.: US 10,565,169 B2
(45) Date of Patent: Feb. 18, 2020

(54) SYSTEM AND METHOD FOR DYNAMIC GENERATION OF A MANAGEMENT INFORMATION BASE THROUGH COMMON INFORMATION MODEL CLASS TRANSFORMATION

(71) Applicant: Dell Products, LP, Round Rock, TX (US)

(72) Inventors: Chitrak Gupta, Bangalore (IN); Ajay Shenoy, Bangalore (IN); Lucky Pratap Khemani, Bangalore (IN); Sushma Basavarajaiah, Bangalore (IN)

(73) Assignee: Dell Products, LP, Round Rock, TX (US)

(*) Notice: Subject to any disclaimer, the term of this patent is extended or adjusted under 35 U.S.C. 154(b) by 744 days.

(21) Appl. No.: 14/830,329

(22) Filed: Aug. 19, 2015

(65) Prior Publication Data
US 2017/0052978 A1    Feb. 23, 2017

(51) Int. Cl.
*G06F 16/00* (2019.01)
*G06F 16/178* (2019.01)
*H04L 12/24* (2006.01)

(52) U.S. Cl.
CPC ...... *G06F 16/1794* (2019.01); *H04L 41/0213* (2013.01)

(58) Field of Classification Search
CPC .............. H04L 41/0213; H04L 41/0226; H04L 41/046; H04L 41/0253; G06F 8/34
USPC .......................................... 707/687; 709/230
See application file for complete search history.

(56) References Cited

U.S. PATENT DOCUMENTS

| | | | |
|---|---|---|---|
| 5,265,245 A * | 11/1993 | Nordstrom | G06F 9/52 |
| 6,948,120 B1 * | 9/2005 | Delgobbo | G06F 9/451 |
| | | | 715/207 |
| 8,139,256 B2 * | 3/2012 | Motamed | H04N 1/00384 |
| | | | 358/1.1 |
| 8,387,069 B2 | 2/2013 | Yin et al. | |
| 8,719,768 B2 | 5/2014 | Hass et al. | |
| 9,634,918 B2 * | 4/2017 | Lipstone | H04L 41/509 |
| 2003/0101251 A1 * | 5/2003 | Low | G06F 8/34 |
| | | | 709/223 |
| 2003/0115197 A1 * | 6/2003 | Horan | H04L 41/0226 |
| 2003/0120760 A1 * | 6/2003 | Fortin | H04L 41/0213 |
| | | | 709/221 |

(Continued)

FOREIGN PATENT DOCUMENTS

EP    1 715 619 B1    10/2008

OTHER PUBLICATIONS

"Installing and Using the SNMP Adapter for WBEM," Solaris WBEM Serivces Administration Guide, 2010, Oracle Corporation and/or its affiliates; pp. 1-2; http://docs.oracle.com/cd/E19683-01/806-6827/6jfoa8m7h/index.html#adapter-proc-105.

(Continued)

*Primary Examiner* — Hanh B Thai
(74) *Attorney, Agent, or Firm* — Larson Newman, LLP

(57) ABSTRACT

An information handling system includes a processor, a managed device that provides a function to the processor, wherein the function is managed in accordance with a Managed Object Format (MOF) file, and a management controller that receives the MOF file, converts the MOF file to a Management Information Base (MIB), and manages the function based upon the MIB.

17 Claims, 3 Drawing Sheets

(56) References Cited

U.S. PATENT DOCUMENTS

| | | | |
|---|---|---|---|
| 2003/0135648 A1* | 7/2003 | Porter | H04L 41/0213 |
| | | | 709/246 |
| 2003/0200301 A1* | 10/2003 | Trzcinko | H04L 41/0253 |
| | | | 709/223 |
| 2004/0120013 A1* | 6/2004 | Elkady | G06K 15/00 |
| | | | 358/1.18 |
| 2005/0180642 A1* | 8/2005 | Curry | G06K 9/00456 |
| | | | 382/232 |
| 2006/0242284 A1 | 10/2006 | Savage | |
| 2007/0073740 A1* | 3/2007 | Kirshenbaum | G06F 9/4488 |
| 2007/0220159 A1* | 9/2007 | Choi | H04L 41/0213 |
| | | | 709/230 |
| 2007/0276847 A1* | 11/2007 | Butler | G06F 16/24534 |
| 2008/0126551 A1 | 5/2008 | Conner et al. | |
| 2008/0168430 A1* | 7/2008 | Browne | G06F 9/454 |
| | | | 717/137 |
| 2010/0299438 A1* | 11/2010 | Zimmerman | H04N 7/17318 |
| | | | 709/226 |
| 2016/0077920 A1* | 3/2016 | Regni | G06F 16/27 |
| | | | 707/649 |

OTHER PUBLICATIONS

"Smidump—dump SMI or SPPI modules in various formats," F. Strauss, IET Library; 2004; 4 pgs.; http://www.ibr.cs.tu-bs.de/projects/libsmi/smidump.html.

"Development of an IETF Standard Methodology for Converting SNMP MIBs to XML Documents via XSD," B. Natale; IETF 70; Ops Area Open Meeting; Vancouver; Dec. 3, 2007.

* cited by examiner

SYSTEM AND METHOD FOR DYNAMIC GENERATION OF A MANAGEMENT INFORMATION BASE THROUGH COMMON INFORMATION MODEL CLASS TRANSFORMATION

FIELD OF THE DISCLOSURE

This disclosure generally relates to information handling systems, and more particularly relates to a system and method for dynamic generation of a management information base (MIB) through common information model (CIM) class transformation.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
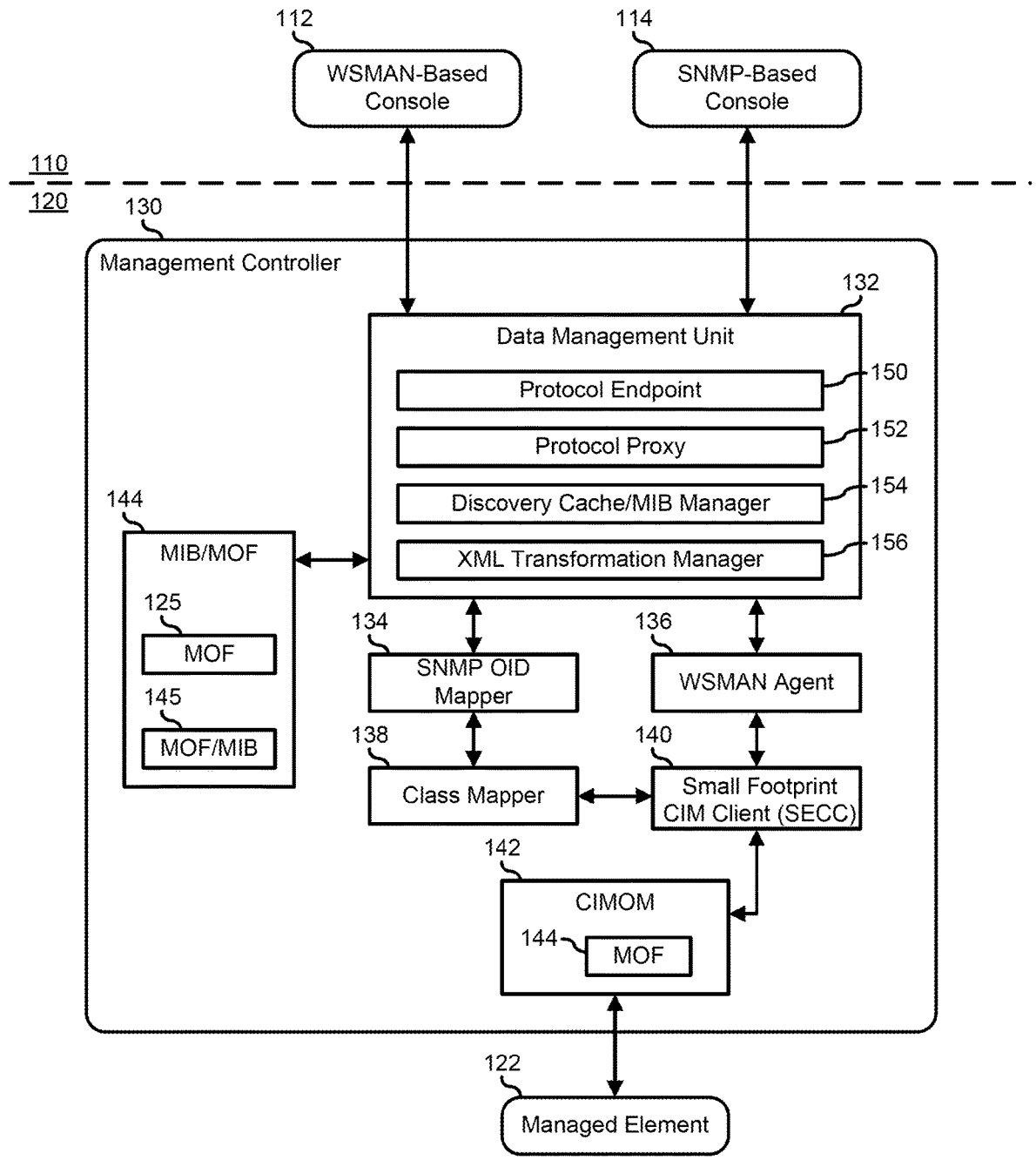
FIG. 1 is a block diagram illustrating a managed system according to an embodiment of the present disclosure.

FIG. 1 illustrates an embodiment of a managed system 100. For the purpose of this disclosure, managed system 100 can be implemented by one or more information handling systems and can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Managed system 100 includes a management system 110 and an information handling system 120. Management system 110 represents an interface to information handling system 120 that provides for out-of-band (OOB) monitoring and control of information handling system 120. As such, information handling system 120 includes a processor complex (not illustrated) that provides computing functions and features of the information handling system, such as a Basic Input/Output System (BIOS) or Universal Extensible Firmware Interface (UEFI), an operating system (OS), and applications and programs that provide the computing functions and features. Additionally, information handling system 120 includes a management controller 130 that provides a separate management co-processor functionality for the OOB monitoring and control of the information handling system. In particular, information handling system 120 includes a managed element 122 that is coupled to management controller 130, and that operates to provide monitoring information to the management controller, and to receive control information from the management controller. An example of management controller 130 includes a device which operates according to the Intelligent Platform Management Interface (IPMI) specification, and can include a Baseboard Management Controller (BMC), an Integrated Dell Remote Access Controller (iDRAC), another management device, or a combination thereof. Management system 110 includes a WSMAN-based management console 112 and a SNMP-based management console 114. One or more of management consoles 112 and 114 can include a Graphical User Interface (GUI) that permits a user to easily interact with managed elements 122 and 124. In a particular embodiment, management consoles 112 and 114 represent a single common interface that provides the functions and features of the management consoles in a unified manner.

Managed element 122 operates to provide monitoring information, and to receive control information in accordance with one or more of a Simplified Network Management Protocol (SNMP) and a Web Services Management (WSMAN) protocol. As such, managed element 122 can operate as an SNMP managed element, including one or more management objects that are identified by a unique Object Identification (OID), and that define the monitoring and control parameters for the SNMP managed element. The OIDs for managed device 122 are collected together in a Management Information Base (MIB) that can be used by management controller 130 to access the monitoring and control parameters. The MIB is provided in a hierarchical structure, and is accessed via an SNMP agent (not illustrated) in managed element 122.

Managed element 122 can also operate as a WSMAN managed element. As such, managed element 122 can be represented by a Managed Object File (MOF) file that describes the WSMAN managed element. The MOF file describes a class for the WSMAN managed element, one or more instances of information that is provided from the WSMAN managed element, one or more methods associated with the WSMAN managed element, such as for providing control information, qualifiers to the classes, instances, and methods, and associations with other managed elements. The MOF file is used by management controller 130 to access the monitoring and control parameters of managed element 122. The WSMAN protocol is a particular implementation of the Common Information Model (CIM). The skilled artisan will recognize that the use of WSMAN in the illustration of FIG. 1 is exemplary, and that other implementations of the CIM can be utilized in conjunction with the teachings of the present disclosure, as needed or desired.

Management controller 130 includes a data management unit 132, a SNMP OID mapper 134, a WSMAN agent 136, a class mapper 138, a small footprint CIM Client (SFCC) 140, a CIM Object Manager (CIMOM) 142, and a MIB/MOF repository 144. Data management unit 132 includes a protocol endpoint 132 that operates to receive WSMAN-based interactions from WSMAN management console 112 and to receive SNMP-based interactions from SNMP management console 114. Data management unit 132 also includes a protocol proxy 152 that operates to direct the SNMP-based interactions from protocol endpoint 150 to SNMP OID mapper 134, and to direct the WSMAN-based interactions from the protocol endpoint to WSMAN agent 136.

WSMAN management console 112 provides an interface for management system 110 to interact with data management unit 132, for example to receive monitoring information and provide control information to the managed element. As such, WSMAN management console 112 operates in accordance with the WSMAN protocol and utilizes WSMAN commands to interact with managed element 122. For example, managed element 122 can provide MOF 144 to CIMOM 142. Then, when data management unit 132 receives a WSMAN command, the WSMAN command can be directed from protocol proxy 152 to WSMAN agent 136 and through SFCC 136 to CIMOM 142 to be process the WSMAN command. Moreover, when managed element 122 is a SNMP managed element, CIMOM 142 generates MOF file 144 based on the MIB of the managed element, and that permits WSMAN commands to be utilized to receive monitoring information and provide control information to the managed element.

Management controller 130 also provides an interface for SNMP management console 114 to interact with managed element 122, for example to receive monitoring information and provide control information to the managed element. As such, SNMP management console 114 operates in accordance with one or more versions of the SNMP protocol, and utilizes SNMP commands to interact with managed element 122. For example, data management unit 132 can receive a SNMPGET command to poll the managed element to send the monitoring information, can receive a SNMPSET command to send the control information to the managed element to set an operating state of the managed element, or can receive a SNMPTRAP command to set a condition upon which the managed element sends the monitoring information. The skilled artisan will recognize that other SNMP commands may be received and processed by data management unit 132, depending upon which version of the SNMP standard is implemented by the managed element. For example, managed element 122 can implement version 1 of the SNMP standard (SNMPv1), version 2 of the SNMP standard (SNMPv2), or version 3 of the SNMP standard (SNMPv3), as needed or desired.

Here, management controller 130 operates to convert MOF file 144 into an associated MIB, such that SNMP management console 114 can process SNMP-based interactions with the WSMAN managed element. To this end, data management unit 132 also includes a discovery cache/MIB manager 154, and an XML transformation manager 156. Discovery cache/MIB manager 154 operates to determine that SNMP management console 114 has instituted an interaction with managed element 122, and directs XML transformation manager 156 to convert MOF file 125 into the associated MIB. Then, when SNMP-based console 114 provides an SNMP command to data management unit 132, proxy protocol 152 directs the SNMP command to SNMP OID mapper 134 which maps the SNMP command to a particular WSMAN class, and forwards the WSMAN class call to CIMOM 142 to receive monitoring information and provide control information to managed element 122.

Figure 2:
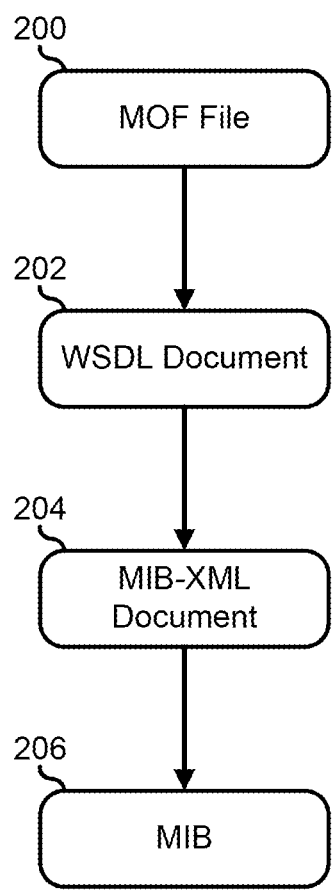
FIG. 2 is a flowchart illustrating a method of converting a Managed Object Format file into a Management Information Base according to an embodiment of the present disclosure.

FIG. 2 illustrates a method of converting a MOF file into a MIB, starting with a MOF file associated with a WSMAN managed element such as managed element 122, in block 200. The MOF file is converted into a Web Services Descriptor Language (WSDL) document in block 202. The WSDL document is an XML based document that describes the class, data, properties, and methods associated with the managed element as collections of endpoints. In particular, each class included in the MOF is mapped to a parent level OID which defines a group of devices. For example, Table 1 illustrates the CIM classes associated with a storage controller, and the associated SNMP equivalent OIDs. As such, each CIM class is uniquely located within the hierarchy of the SNMP specification.

TABLE 1

| CIM Class to SNMP OID | |
|---|---|
| CIM Class | SNMP Equivalence |
| DCIM_ControllerView | storageController |
| DCIM_PhysicalDiskView | physicalDevices |
| DCIM_VirtualDiskView | logicalDevices |

Thus, using the example of Table 1, the CIM classes are mapped to the equivalent OIDs as follows:

```
storageDetailsGroup   OBJECT IDENTIFIER ::= { outOfBandGroup 5 }
software              OBJECT IDENTIFIER ::=
                        { storageDetailsGroup 1 }
storageManagement     OBJECT IDENTIFIER ::= { software 20 }
storageController     OBJECT IDENTIFIER ::=
                        { storageManagement 120 }
storageDevices        OBJECT IDENTIFIER ::=
                        { storageManagement 130 }
logicalDevices        OBJECT IDENTIFIER ::=
                        { storageManagement 140 }
```

Further, each property included in the MOF is mapped to an equivalent property associated with the SNMP class OIDs. For example:

```
CIM Class: DCIM_SystemView::Redundancy Status
SNMP MIB: StatusRedundancyEnum  ::= INTEGER {
other(1),        -- redundancy status is not one of the following:
unknown(2),      -- redundancy status is unknown (not known or
monitored)
full(3),         -- object is fully redundant
degraded(4),     -- object's redundancy has been degraded
lost(5),         -- object's redundancy has been lost
notRedundant(6), -- redundancy status does not apply/object not
redundant
redundancyOffline(7),    -- fedundancy object taken offline
}
```

Finally, each method included in the MOF is mapped such that a settable OID is mapped to the WSMAN. The property of the OID is named SNMP_PropertyName_Method. Then, each parameter will include settable properties as defined by the OID.

Continuing with FIG. 2, the WSDL document of block 202 is then transformed by an Extensible Stylesheet Language Transformation (XSLT) file into a MIB-XML document. An example of an XSLT for transforming the WSDL document of block 202 inot the MIB-XML document of block 204 is given as:

```
<?xml version="1.0" encoding="utf-8"?>
<xsl:stylesheet
  xmlns:swdl="http://schemas.xmlsoap.org/wsdl/"
  xmlns:xsl="http://www.w3.org/1999/XSL/Transform"
  version="1.0">
  <xsl:import href="wsdl-util.xs."/>
  <xsl:strip-space elements="*"/>
  <xsl:output method="text"/>
  <!--print out the namespace URIs associated with input messaes -->
  <xsl:template match="swdl:input[@message]">
    <xsl:text>prefix of </xsl:text>
    <xsl:value-of select="name( )"/>
    <xsl:text>maps to namespace uri </xsl:text>
    <xsl:call-template name="namespace-uri-of-qname">
      <xsl:with-param name="qname" select="name( )"/>
    </xsl:call-template>
<xsl:text>
<xsl:text>prefix of </xsl:text>
    <xsl:value-of select="message"/>
    <xs.:text> maps to namespace uri </xsl:text>
    <xsl:call-template name="namespace-uri-of-qname">
      <xsl:with-param name="qname" select="@message"/>
    </xsl:call-template>
</xsl:text>
  </xsl:template>
</xsl:stylesheet>
```

Finally, the MIB-XML document from block 204 is parsed into separate objects to provide the resulting MIB in block 206, and the conversion is completed.

Returning to FIG. 1, after the MIB is generated for MOF 125, both the MOF and the MIB are stored in MIB/MOF repository 144. Here, the MIB is shown as MOF/MIB 145. When protocol endpoint 150 receives an incoming SNMP call from SNMP management console 114, discovery cache/MIB manager 154 validates the OID associated with the SNMP call by searching MIB/MOF repository 144. If the OID is valid, and the SNMP call is to the OID associated with MOF/MIB 145, then the SNMP call is mapped to a corresponding CIM call. For example, if the SNMP call is an SNMPGET or an SNMPBULKGET call, the call is mapped to a CIM enumerate/get call. If the SNMP call is an SNMPSET call, the call is mapped to a CIM intrinsic set call or a CIM invoke method call. The mapping is established in class mapper 138 by maintaining a database of OIDs and their hashed values to the CIM methods and properties. The following is an exemplary hash structure:

Hash[key=Set_OID]={TypeEnum[Set, SetAttributes, Invoke], ParameterList} where the ParameterList is an indexed list which is set by SNMP management console 114 via a SNMPSET command.

If the SNMP call is a SNMPTRAP, CIMOM 142 is queried to enumerate the event filter configuration. The list of all messageIDs which have SNMP management console 114 identified as the PossibleNotification target are identified. Here, the enumeration XML file for the event filter configuration, along with the message registry information is used to generate the trap MIB, and the XSLT transformation file maps the MessageIDs to respective trap OIDs.

In implementing the conversions as described above, management consoles 112 and 114 provide functions to export MOF/MIB 145 from MIB/MOF repository 114 or from managed element 122, and to import the MOF/MIB to the SNMP management console. Further, SNMP management console 114 provides a function to convert an OID from managed element 122 to an OID to an equivalent CIM attribute, and WSMAN management console 112 provides a function to convert a CIM attribute from managed element 122 to an equivalent OID. Moreover, management consoles 112 and 114 provide a function to import and export the CIM attribute-to-OID mappings.

Figure 3:
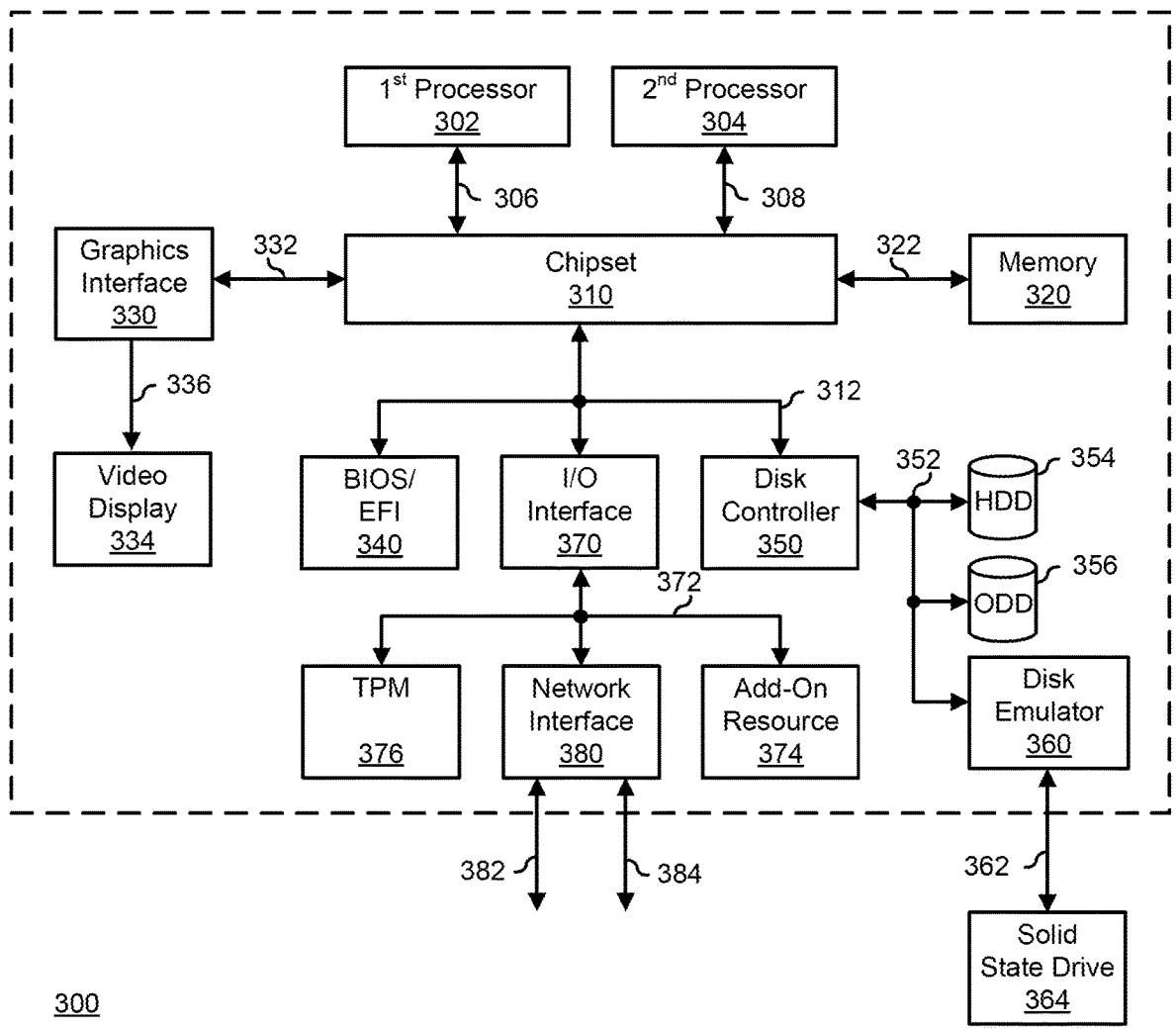
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor;
   a managed device that provides a function to the processor, wherein the function is managed in accordance with a Managed Object Format (MOF) file; and
   a baseboard management controller configured to:
      receive a first command to manage the function, the first command in accordance with a Web Services Management (WSMAN) protocol and including a call to manage the function using the MOF file;
      manage the function based upon the MOF file;

receive a second command to manage the function, the second command in accordance with a Simplified Network Management Protocol (SNMP) and including a call to manage the function using a Management Information Base (MIB);
convert the MOF file to the MIB; and
manage the function based upon the MIB,
wherein in converting the MOF file to the MIB, the baseboard management controller converts the MOF file into a Web Services Descriptor Language (WSDL) document such that each property of the MOF file is mapped to an associated property of a SNMP Object Identifier (OID), wherein in mapping each property of the MOF file to the associated property of the SNMP OID, the baseboard management controller further maintains a database of hashed values of the SNMP OIDs to an associated common information model method or property.

2. The information handling system of claim 1, wherein the baseboard management controller further receives an SNMP instruction, wherein managing the function is in response to receiving the SNMP instruction.

3. The information handling system of claim 2, wherein the SNMP instruction is received from an SNMP management console coupled to the baseboard management controller.

4. The information handling system of claim 1, wherein the WSDL document describes class, properties, and methods from the MOF file as endpoints and each class endpoint is mapped to the SNMP OID.

5. The information handling system of claim 4, wherein each property endpoint is mapped to the SNMP OID property.

6. The information handling system of claim 1, wherein in converting the MOF file to the MIB, the baseboard management controller further converts the WSDL document to an MIB-XML document via an Extensible Stylesheet Language Transformation (XSLT) file.

7. The information handling system of claim 6, wherein in converting the MOF file to the MIB, the baseboard management controller further parses the MIB-XML into the MIB.

8. A method, comprising:
providing, by a managed device, a function to a processor of an information handling system, wherein the function is managed in accordance with a Managed Object Format (MOF) file;
receiving, at a baseboard management controller of the information handling system, a first command to manage the function, the first command in accordance with a Web Services Management (WSMAN) protocol and including a call to manage the function using the MOF file;
managing the function based upon the MOF file;
receiving a second command to manage the function, the second command in accordance with a Simplified Network Management Protocol (SNMP) and including a call to manage the function using a Management Information Base (MIB);
converting the MOF file to the MIB, the converting including converting the MOF file into a Web Services Descriptor Language (WSDL) document such that each property of the MOF file is mapped to an associated property of a Simplified Network Management Protocol (SNMP) Object Identifier (OID), wherein in mapping each property of the MOF file to the associated property of the SNMP OID, the method further comprises maintaining a database of hashed values of the SNMP OIDs to an associated common information model method or property; and
managing, by the baseboard management controller, the function based upon the MIB.

9. The method of claim 8, further comprising:
receiving the SNMP instruction,
wherein managing the function is in response to receiving the SNMP instruction.

10. The method of claim 9, wherein the SNMP instruction is received from an SNMP management console coupled to the baseboard management controller.

11. The method of claim 8, wherein:
the WSDL document describes classes, properties, and methods from the MOF file as endpoints;
the method further comprises mapping each class endpoint to the SNMP OID.

12. The method of claim 11, further comprising:
mapping each property endpoint to the SNMP OID property.

13. The method of claim 8, wherein in converting the MOF file to the MIB, the method further comprises:
converting the WSDL document to an MIB-XML document via an Extensible Stylesheet Language Transformation (XSLT) file.

14. The method of claim 13, wherein in converting the MOF file to the MIB, the method further comprises:
parsing the MIB-XML document into the MIB.

15. A non-transitory computer-readable medium including code for performing a method, the method comprising:
providing a function to a processor of an information handling system, wherein the function is managed in accordance with a Managed Object Format (MOF) file;
receiving a first command to manage the function, the first command in accordance with a Web Services Management (WSMAN) protocol and including a call to manage the function using the MOF file;
managing the function based upon the MOF file;
receiving a second command to manage the function, the second command in accordance with a Simplified Network Management Protocol (SNMP) and including a call to manage the function using a Management Information Base (MIB);
converting the MOF file to the MIB, the converting including converting the MOF file into a Web Services Descriptor Language (WSDL) document such that each property of the MOF file is mapped to an associated property of a Simplified Network Management Protocol (SNMP) Object Identifier (OID), wherein in mapping each property of the MOF file to the associated property of the SNMP OID, the method further comprises maintaining a database of hashed values of the SNMP OIDs to an associated common information model method or property; and
managing, by a baseboard management controller, the function based upon the MIB.

16. The computer-readable medium of claim 15, the method further comprising:
Receiving receiving, at the baseboard management controller further, an SNMP instruction, wherein managing the function is in response to receiving the SNMP instruction.

17. The computer-readable medium of claim 15, wherein in converting the MOF file to the MIB, the method further comprises:
parsing and MIB-XML into the MIB.

* * * * *